May 2, 1944.  J. A. KINGSTON  2,347,911
HORTICULTURAL AND AGRICULTURAL IMPLEMENT
Filed April 29, 1943
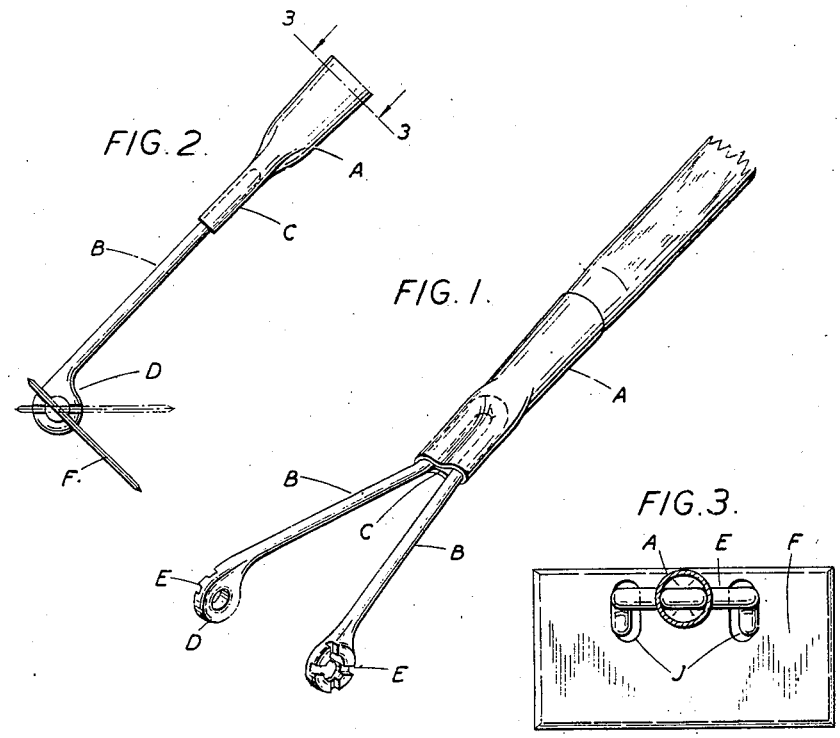
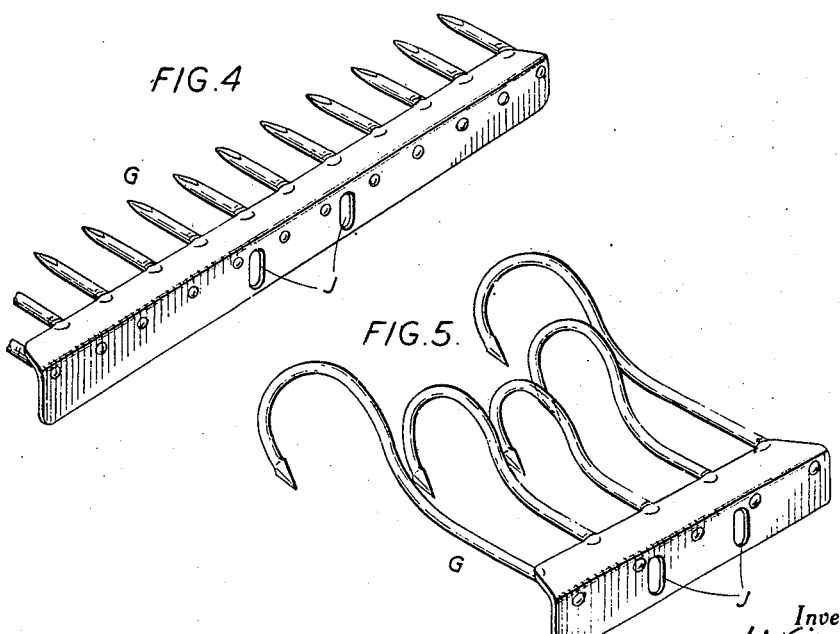
Inventor
J. A. Kingston
By
E. F. Buckworth
Attorney Patented May 2, 1944

2,347,911

UNITED STATES PATENT OFFICE 2,347,911

HORTICULTURAL AND AGRICULTURAL IMPLEMENT

Jonas Arthur Kingston, Reading, England

Application April 29, 1943, Serial No. 485,066
In Great Britain April 24, 1942

2 Claims. (Cl. 306—2)

This invention relates to horticultural and agricultural implements, and has for its chief object to provide improved means for assembling, adjustably and interchangeably, the heads with the handles or handle sockets of tools such as hoes, rakes and the like.

The implement of the present invention is of the kind in which a tool head is removably connected to a handle by the intervention of a spring fork.

According to the present invention the interconnecting means between the tool head and the handle consists of a two-pronged spring fork having enlarged flattened ends each of which is formed with a plurality of grooves set at different angles relatively to the main axle of the fork and handle for spring-forked engagement with a tool head in one or other of a plurality of different angular working attitudes. Each enlarged end of the fork may be formed in one piece with its prong or the enlarged ends may be separate pieces attached to the prongs as by screwing. The engagement of the fork ends by the tool head is afforded by providing the tool head with a plate having two slots spaced apart for spring-fork engagement with the grooves in the enlarged ends of the fork prongs.

It will be understood that by providing a number of differently functioning tool heads each with the same slotted plate, there results an outfit readily convertible from one to another of a number of different purposes.

In order that the invention may be clearly understood and readily carried into effect the same will now be described more fully with reference to the accompanying drawing which illustrates one embodiment and in which:

Figure 1 is a perspective view of a handle and handle socket including a fork having a substantially U-shaped portion for attachment to a tool head in accordance with the invention.

Figure 2 is a side elevation of the handle socket interconnected with a hoe blade.

Figure 3 is a view taken on the line 3—3 of Figure 2.

Figure 4 is a view of a rake head, and

Figure 5 a view of a cultivating tool, adapted for combination with the socket of Figure 1.

The handle socket illustrated consists of a short length of tubing A tapered slightly at one end to receive a tool handle and ovally deformed at the other end to receive the stem of an extension member. The extension member is formed from a length of stout wire or bar bent midway in its length to form a fork B having a substantially U-shaped stem portion. The tube A may of course be sufficiently long to serve as a handle having its remote end serving as a socket. The U-shaped stem portion of the fork B is inserted into the ovally deformed end of the tube A and the tube end is then further deformed to collapse upon itself as shewn at C and thereby grip and trap the U-shaped stem portion of the extension member. In this way a firm interconnection is made by a simple mechanical operation and without requiring any screws, nails or bolts, or welding.

The free ends of the fork B are shaped to form disc-like ends D or such ends are screwed or otherwise secured to the arms of the fork, and each end D is formed with a plurality of grooves E extending diametrically across its outer face. Each of a number of tool heads, such as the hoe blade F and the garden rake G and the cultivating tool H, comprises a plate in which are formed two slots J for the reception of the ends D.

The arms of the fork B are stiffly resilient so that by grasping them forcibly they may be forced towards one another sufficiently to permit insertion in the slots J which they securely engage as soon as the hand grip is relaxed.

It will be understood that the outer edges of the slots J may engage with any selected pair of grooves E on the ends D, depending upon the angular setting desired for the tool head relatively to the axis of the tool, as shewn for example by the full line position and the dotted line position of the hoe blade F in Figure 1.

What I claim is:

1. An implement consisting of a tool handle socket, a tool head, and an extension member uniting said socket and head and constituted by a bar bent midway upon itself to present a U-shaped stem portion insertable into the handle socket and two spaced resilient limbs forming a fork, disc-shaped terminals on the fork limbs facing each other and each having a plurality of diametrical slots on its outer face, the tool head comprising a plate member having two slots spaced at a distance apart slightly less than the normal distance apart of the fork limb ends and of a size to permit said ends to be inserted through the slots when the fork limbs are deflected to permit the insertion.

2. An implement consisting of a tool handle and a tool head and interconnecting means between said handle and head comprising a two-limbed spring fork extending forwardly from the handle, each limb having the free end enlarged and flattened to face the similar free end of the other limb and being provided on one face with a plurality of grooves set at different angles relatively to the main axis of the fork and handle, and a plate on the tool head, said plate being provided with two slots spaced apart for spring-forked engagement with a pair of grooves in the aforesaid enlarged limb ends of the fork in one or other of a plurality of different angular working attitudes.

JONAS ARTHUR KINGSTON.